Jan. 6, 1970   IKUO MITA ET AL   3,488,681

WEATHER TESTER

Filed Aug. 6, 1968   2 Sheets-Sheet 1

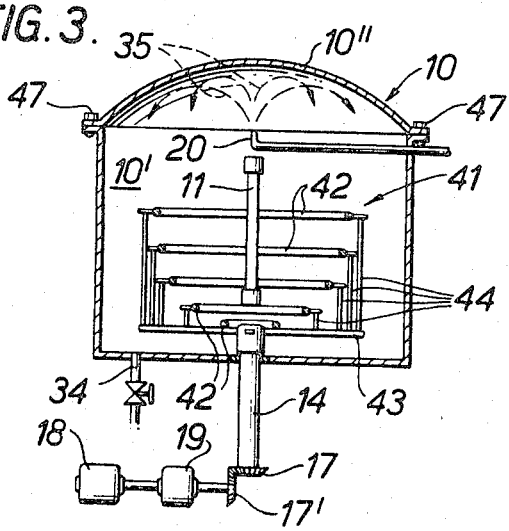
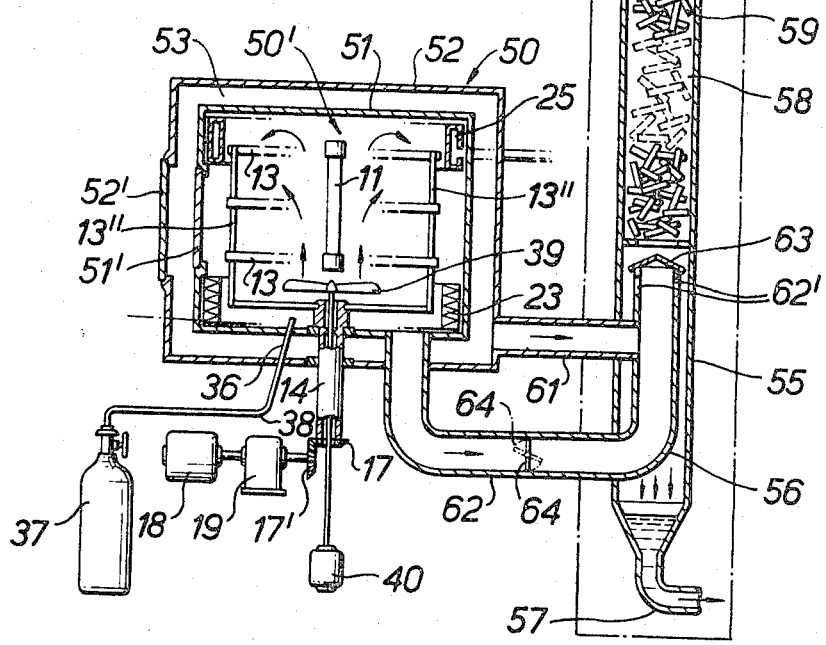

United States Patent Office 3,488,681
Patented Jan. 6, 1970

3,488,681
WEATHER TESTER
Ikuo Mita and Masakatsu Mushiro, Tokyo, and Shozo Morishima, Kanji Fujii, and Yoshio Tanaka, Kyoto, Japan, assignors to Shimadzu Seisakusho Ltd., Kyoto, Japan, a corporation of Japan, and the Tokyo Metropolitan Government, Tokyo, Japan, jointly
Filed Aug. 6, 1968, Ser. No. 750,594
Claims priority, application Japan, Aug. 7, 1967, 42/50,873, 42/50,874, 42/68,388
Int. Cl. G01n 25/02
U.S. Cl. 73—15.4      14 Claims

ABSTRACT OF THE DISCLOSURE

An apparatus for rapidly determining in the laboratory the resistance to light and weathering of various kinds of materials. The apparatus is capable of exposing various specimens not only to light, temperature and moisture, but also to corrosive liquids and/or gases such as those contaminating water and atmosphere, thereby simulating the actual environment as closely as possible so that the results of the test become more accurate and reliable. The apparatus may have a housing of double-wall construction which is capable of preventing leakage of any corrosive gas harmful to the operator.

---

This invention relates to an apparatus for rapidly determining in the laboratory the resistance to light and weathering of various kinds of materials.

There are known various types of such machines, generally referred to as weather testers, wherein specimens to be tested are exposed to light, temperature and moisture artificially provided so as to observer and record any changes occurring as time passes in their color, apperance and other physical properties. Light, temperature and moisture alone, however, are not sufficient factors to rely on in simulating our environment in which various materials find themselves. Clothing, for example, is not only exposed to light and atmosphere, but also dirtied by perspiration, oil and other various corrosive liquids. Moreover, in recent years atmosphere is significantly contaminated by various gases such as sulfur dioxide produced by automobiles, chemical and other plants and factories. To simulate our environment as closely as possible, therefore, these factors must also be taken into consideration.

Accordingly, it is one object of the invention to provide a weather tester wherein simulating factors are not only light, temperature and moisture, but also corrosive liquids such as perspiration, sea water or the like, and wherein these factors exit individually or in combination with each other and in different degrees.

Another object of the invention is to provide a weather tester wherein simulating fatcors are not only light, temperature, moisture and corrosive liquids, but also corrosive gases, and wherein these factors may exit individually or in combination with each other and in different degrees.

Corrosive gases used in the test are generally poisonous, and if they leak out of the test chamber, they will do harm to the operator of the apparatus.

Accordingly, another object of the invention is to provide a weather tester which can completely prevent leakage of the corrosive gas from the test chamber.

Other objects, features and advantages of the invention will become more apparent from the following detailed description thereof with reference to the accompanying drawings, wherein like reference numerals denotes like parts and wherein;

FIG. 3 is a view similar to FIG. 1 but showing a different specimen rack; and

FIG. 4 is a view similar to FIG. 1 but showing still another embodiment of the invention.

Figure 1:
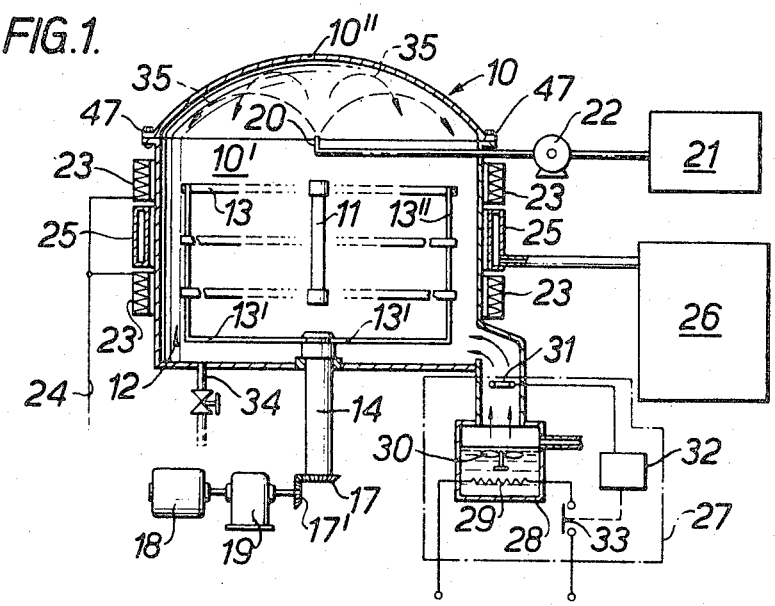
FIG. 1 is somewhat a schematic elevational view, in vertical section, of one embodiment of the invention.

Now referring to the drawings, first to FIG. 1, there is shown a housing generally designated by 10 and tightly sealed against atmosphere to define a test chamber 10' therein. Inside the test chamber, a light source 11 such as a Xenon lamp is centrally located in a specimen holding rack 12 which slowly rotates about the lamp 11. The lamp is supported in place by suitable arm members, not shown.

The specimen rack comprises a plurality of ring members 13; a plurality, say, four horizontal rods 13', only two of which are shown, radially extending from a drive shaft 14 equiangularly spaced thereabout; and a plurality, say, four vertical rods 13", only two of which are shown, standing from the outer ends of the horizontal rods 13' so as to support the rings 13 vertically spaced apart from each other. Specimens to be tested are tied or otherwise secured to the rings 13, as is well known in the art.

The drive shaft 14 is provided at its lower end with a bevel gear 17 meshing with a bevel gear 17' which is rotated by a motor 18 through reduction gear 19.

If the specimens are in liquid form, the rack may be replaced by one provided with a plurality of vessels adapted to contain liquid.

The housing 10 has a lid or ceiling 10" formed into a dome, which is detachably secured to the housing as at 47. The lid 10" is taken off for access into the test chamber and the specimen rack 12. A nozzle 20 opens upwardly toward the center of the inside of the dome. A tank 21 contains a liquid such as a solution containing sodium chloride, cupric chloride, sulfuric acid, etc., which is sprayed by means of a pump 22 out of the nozzle against the inner surface of the dome 10", where the spray is reflected and spread evenly about to fall down through the rack, staining the specimens thereon.

A pair of electric heaters 23 supplied with energy through a line 24 surround the housing lateral wall in heat conductive relation thereto. The heaters are used when test is to be conducted above room temperature. A cooling duct 25 also encircles the housing in thermally conductive relation to the lateral wall thereof. A refrigerator 26 provides a cooling medium to be circulated through the duct 25. The cooling device is used when test is to be conducted below room temperature.

A moisture controller 27 comprises a water tank 28 communicating with the test chamber 10' near the bottom wall thereof. An electric heater 29 is provided in the tank to cause the water to evaporate into the test chamber. To accelerate the evaporation, an electric fan 30 is provided to agitate the water. To control the moisture content of the atmosphere in the test chamber, a heat sensitve element 31 is disposed in the way of the vapour from the water in the tank to detect its temperature and product a corresponding electrical signal. A control circuit 32 is designed to operate when a predetermined temperature level has been detected by the element 31, whereupon a switch 33 is opened to break the supply line to the electric heater 29 in the water tank until the temperature of the steam is reduced down to a preset level. Thus, the temperature of the steam evaporated from the water in the tank 28 and consequently the humidity of the atmosphere in the test chamber 10' are maintained at a predetermined constant level.

A drain pipe 34 is provided at the bottom wall of the housing 10 to evacuate the corrosive liquid, etc.

In operation, specimens to be tested are tied or otherwise fixed to the rack 12. The rack is then slowly rotated, with the lamp 11 being illuminated. The temperature and humidity in the test chamber 10' are kept at a predetermined constant level by operating the moisture controller 27 and if necessary, the heaters 23 or refrigerator 26. Then, corrosive liquid is sprayed out of the nozzle 20 to be reflected by the dome and evenly spread around as shown at 35 down through the rack to cause various effects on the specimens in combination with the light, temperature and moisture.

Figure 2:
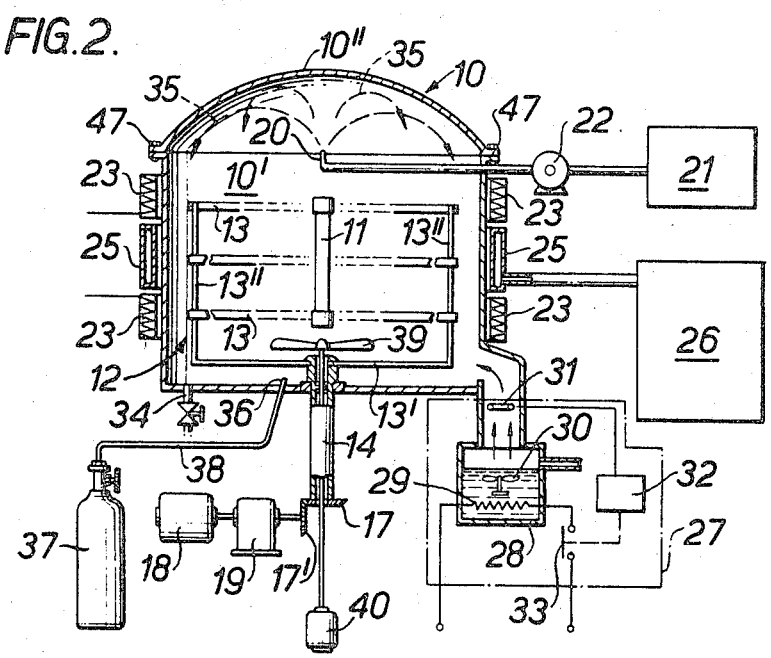
FIG. 2 is a view similar to FIG. 1 but showing another embodiment of the invevntion.

FIG. 2 shows another embodiment of the invention. Here, the general construction and arrangement are similar to the embodiment of FIG. 1, except that in FIG. 2 another nozzle 36 opens at the bottom wall of the housing 10 to introduce into the test chamber 10' a corrosive gas such as sulfur dioxide from a bomb 37 through a conduit 38, and that a fan 39 driven by a motor 40 centrally located in the specimen rack 12 below the lamp 11 so as to evenly spread the gas and circulate it in the chamber. With the arrangement of FIG. 2, it is possible to know the effect of a corrosive gas individually or in combination with the other factors on the specimens.

In FIGS. 1 and 2, the specimen holding rack 12 is of a cylindrical shape, and the specimens being held by the rings 13 are positioned generally vertical.

FIG. 3 shows a rack 41 which can hold specimens in different angular positions. Here, the rack comprises a plurality of rings 42 of different diameters; a plurality of support arms 43 radially extending from the shaft 14 equiangularly spaced from each other thereabout; and a plurality of vertical arms 44 planted on each of the horizontal arms so that the vertical arms 44 are spaced radially apart from each other. Being supported on the upper ends of the vertical arms, the rings 42 are concentrically arranged, each spaced below another of the next larger diameter. It will be easily seen that depending upon the position where specimens are fixed to the rack, they may lie at different angular positions with respect to the vertical axis of rotation of the rack, and that corrosive liquid stays on the specimens for different periods of time. Therefore, with the same amount of corrosive liquid spread from the nozzle 20, it is possible to know the resistance of specimens as they are in different positions.

In the above embodiments, although the housing 10 is tightly sealed, if the corrosive gas, say, sulfur dioxide should leak out, it would do harm to the operator of the apparatus.

FIG. 4 shows an arrangement that can completely prevent any such leakage of the corrosive gas introduced into the test chamber. There is shown a housing 50 of a double-wall construction, that is, comprising an inner wall 51 and an outer wall 52 with a space 53 therebetween, and the inner wall defining a test chamber 50'. Doors 51' and 52' are provided in the inner and outer walls 51 and 52 of the housing, respectively, for access into the test chamber 50'. A purifier generally designated by 54 comprises an outer tube 55 and an inner tube 56. The outer tube 55 has its upper end 57 open toward atmosphere and its lower end formed into a drain pipe 57. The outer tube 56 also has an intermediate chamber 58 which is filled with a suitable adsorbent such as pieces of porous biscuit 59. Into the chamber 58 a pipe 60 pours water, which gravitates through the adsorbent pieces 59 and is finally discharged through the pipe 57. Below the chamber 58 the inner tube 56 is connected to the space 53 of the housing 50 via a duct 61 and to the test chamber 50' via a duct 62. The inner tube has its upper end closed by a lid 63 so as to prevent the water dropping from the outer tube 55 of the outer tube 55 from entering the inner tube 56, and is formed with openings 62' below the lid 63.

In the duct 62 a valve 64 is provided, which closes the duct 62 when the test chamber 50' is filled with a corrosive gas and opens the same duct when the chamber 50' is to be evacuated.

Near the top end of the outer tube 55 of the purifier, a fan 65 driven by a motor 66 is provided to apply suction to the ducts 61 and 62 to accelerate the evacuation of the gas from the space 53 and the test chamber 50'.

It will be easily seen from the above description that if the gas introduced into the test chamber 50' through the nozzle 36, say, sulfur dioxide should leak out into the space 53 between the two walls 51 and 52 of the housing, the air in the space 53 containing the poisonous gas is sucked by the fan 65 provided in the purifier 54 to pass through the duct 61 and the inner tube 56 of the purifier and then through the openings 62 out into the outer tube 55. The gas then rises through the adsorbent pieces 59 in the chamber 58, where the gas reacts with the water dropping from the supply pipe 60 and the resultant solution, say, sulfurous acid, falls down to be finally discharged through the drain pipe 57. The concentration of the acid is generally as low as is practically harmless. If necessary, however, the acid may be neutralized. The air deprived of the poisonous gas is discharged into atmosphere through the upper open end of the outer tube 55 of the purifier 54.

Since the space 53 between the two walls of the housing 50 is maintained at a little lower level than the atmospheric pressure due to the suction applied thereto by the fan 65, the gas in the space 53 will not leak out directly into atmosphere through the outer wall 52 of the housing.

After the test has been finished, the valve 64 in the duct 62 is opened so that the poisonous gas in the test chamber is purified and then discharged in the above mentioned manner. Then the doors 52' and 51' are opened to take out the specimens.

What we claim is:

1. An apparatus for rapidly testing the resistance to light and weathering of various specimens, comprising: a housing tightly sealable against the atmosphere; a source of light enclosed in said housing; specimen holding means comprising a plurality of rings of different diameters and a plurality of arm members supporting said rings concentrically about a vertical axis of rotation, each of said rings being spaced below another of the next larger diameter, said specimens being detachably secured to said rings so that they are held in different angular positions with respect to said axis of rotation; means for rotating said specimen holding means about said source of light; means for controlling the temperature inside said housing; means for controlling the humidity inside said housing; and means for spreading corrosive liquid over said specimens.

2. The apparatus of claim 1, wherein said temperature controlling means comprises a heating device and a cooling device, both arranged in thermally conductive relation to said housing.

3. The apparatus of claim 1, wherein said housing has a lid formed into a dome, and wherein said corrosive liquid spraying means compises a tank disposed outside said housing and containing a corrosive liquid, a nozzle disposed inside said housing above said specimen holding means and open toward said dome, a conduit connecting said tank and nozzle, and a pump inserted in said conduit.

4. The apparatus of claim 1, wherein said humidity controlling means comprises a water tank which communicates with said housing, an electric heater disposed inside said water tank in order to accelerate evaporation from said water tank, a heat sensitive device above said water tank to sense the temperature of the vapour from said tank; and means operable in response to said heat sensitive device to control the supply of electric energy to said heater.

5. The apparatus of claim 1, further including means for introducing at least one kind of corrosive gas into said housing.

6. The apparatus of claim 5, wherein said corrosive gas introducing means comprising a container containing a gas, a conduit connecting said container and said housing, and means for regulating the flow of said gas through said conduit.

7. The apparatus of claim 5, wherein said specimen holding means comprises a plurality of rings of different diameters, and a plurality of arm members supporting said rings concentrically about a vertical axis of rotation, each said ring spaced below another of the next larger diameter, said specimens being detachably secured to said rings so that they are held in different angular positions with respect to said axis of rotation.

8. The apparatus of claim 5, wherein said temperature controlling means comprises a heating device and a cooling device, both arranged in thermally conductive relation to said housing.

9. The apparatus of claim 5, wherein said housing has a lid formed into a dome, and wherein said corrosive liquid spraying means comprises a tank disposed outside said housing and containing a corrosive liquid; a nozzle disposed inside said housing above said specimen holding means and open toward said dome, a conduit connecting said tank and nozzle, and a pump inserted in said conduit.

10. The apparatus of claim 5, wherein said humidity controlling means comprises a water tank communicating with said housing, an electric heater inside said water tank to accelerate evaporation therefrom, a heat sensitive device above said water tank to sense the temperature of the vapour from said tank, and means operable in response to said heat sensitive device to control the supply of electric energy to said heater.

11. An apparatus for rapidly testing the resistance to light and weathering of various specimens, comprising: a housing comprising an inner and an outer wall, with a space therebetween and said inner wall defining a test chamber; a source of light in said test chamber; means for holding said specimens about said source of light so that the light therefrom illuminates said specimens; means for rotating said specimen holding means about said source of light; means for introducing at least one kind of corrosive gas into said test chamber; and purifying means communicating with said space to remove said gas that has leaked out from said test chamber into said space.

12. The apparatus of claim 11, wherein said purifying means communicates with said test chamber as well as said space, with means for selectively establishing and interrupting the communication of said purifying means with said test chamber.

13. The apparatus of claim 11, further including means for applying suction to said space through said purifying means.

14. The apparatus of claim 12, further including means for applying suction to said space through said purifying means.

References Cited

UNITED STATES PATENTS

| 1,969,606 | 8/1934 | Hall | 73—150 |
| 2,703,488 | 3/1955 | Gerantman et al. | 73—432 |
| 3,224,266 | 12/1965 | Klippert | 73—150 |
| 3,273,802 | 9/1966 | Hull | 73—432 |
| 3,327,536 | 6/1967 | Fitzgerald | 73—432 |

OTHER REFERENCES

Mast Ozone Test Chambers, a publication of Mast Development Co., 2212 E. 12th St., Davenport, Iowa.

S. CLEMENT SWISHER, Primary Examiner

U.S. Cl. X.R.

73—86, 159, 432